United States Patent
PrudHomme Lacroix et al.

(10) Patent No.: US 8,789,792 B2
(45) Date of Patent: Jul. 29, 2014

(54) AIRCRAFT UNDERCARRIAGE HAVING A ROCKER LEVER WITH A SWIVEL AND HINGED TWIN WHEELS

(75) Inventors: Pierre PrudHomme Lacroix, Vitrolles (FR); Robert Dubois, Aix en Provence (FR); Vincent Lassus, Saint Pantaleon (FR)

(73) Assignee: Airbus Helicopters, Marignane Cedex (FR)

( * ) Notice: Subject to any disclaimer, the term of this patent is extended or adjusted under 35 U.S.C. 154(b) by 203 days.

(21) Appl. No.: 12/963,702

(22) Filed: Dec. 9, 2010

(65) Prior Publication Data

US 2011/0155848 A1    Jun. 30, 2011

(30) Foreign Application Priority Data

Dec. 11, 2009  (FR) ...................................... 09 05985

(51) Int. Cl.
*B64C 25/02* (2006.01)
*B64C 25/36* (2006.01)

(52) U.S. Cl.
USPC .................................. 244/100 R; 244/104 R

(58) Field of Classification Search
USPC ................... 244/102 R, 103 R, 104 R, 102 A
See application file for complete search history.

(56) References Cited

U.S. PATENT DOCUMENTS

| | | | |
|---|---|---|---|
| 2,421,914 A | | 6/1947 | Strandberg |
| 2,630,990 A | * | 3/1953 | Lindquist et al. ......... 244/102 R |
| 2,687,857 A | * | 8/1954 | Caldwell et al. ........... 244/103 S |
| 3,643,898 A | * | 2/1972 | Whitener et al. ................ 244/50 |
| 3,771,037 A | * | 11/1973 | Bailey, Jr. ...................... 244/237 |
| 3,904,153 A | * | 9/1975 | Watts ................................ 244/50 |
| 5,060,886 A | * | 10/1991 | Davis et al. ............... 244/100 R |
| 5,337,976 A | * | 8/1994 | Derrien ...................... 244/102 A |
| 6,123,292 A | * | 9/2000 | Ralph ........................ 244/103 R |
| 6,173,920 B1 | * | 1/2001 | Meneghetti ............... 244/100 R |
| 7,040,578 B2 | * | 5/2006 | Halin .......................... 244/129.4 |
| 2005/0159091 A1 | * | 7/2005 | Norton ........................... 451/354 |
| 2008/0277889 A1 | * | 11/2008 | Strobel ...................... 280/47.31 |

FOREIGN PATENT DOCUMENTS

| | | |
|---|---|---|
| FR | 1021477 A | 2/1953 |
| GB | 665796 A | 1/1952 |

OTHER PUBLICATIONS

French Search Report, App. No. 09-05985, filed Aug. 31, 2010.

* cited by examiner

*Primary Examiner* — Joseph W Sanderson
*Assistant Examiner* — Marc Burgess
(74) *Attorney, Agent, or Firm* — Brooks Kushman P.C.

(57) ABSTRACT

An aircraft undercarriage is provided (1). The undercarriage (1) includes a rocker lever (2) having a first end zone (2a) for fastening to at least one point of the structure of the aircraft and a second end zone (2b) connected via a swivel (3) to twin wheels (4) including a wheel axle (9) connecting together two landing wheels (R1, R2). The swivel (3) includes a first portion (3b) that is fastened to the second end zone (2b) of the rocker lever (2) and a second portion (3c) being free to swivel relative to the first portion (3b) about a swivel axis (A1, A2) of the swivel (3). the second portion (3c) is connected to the wheel axle (9) of the twin wheels (4). In addition, the connection between the second portion (3c) of the swivel (3) and the wheel axle (9) includes a hinge (6).

16 Claims, 2 Drawing Sheets

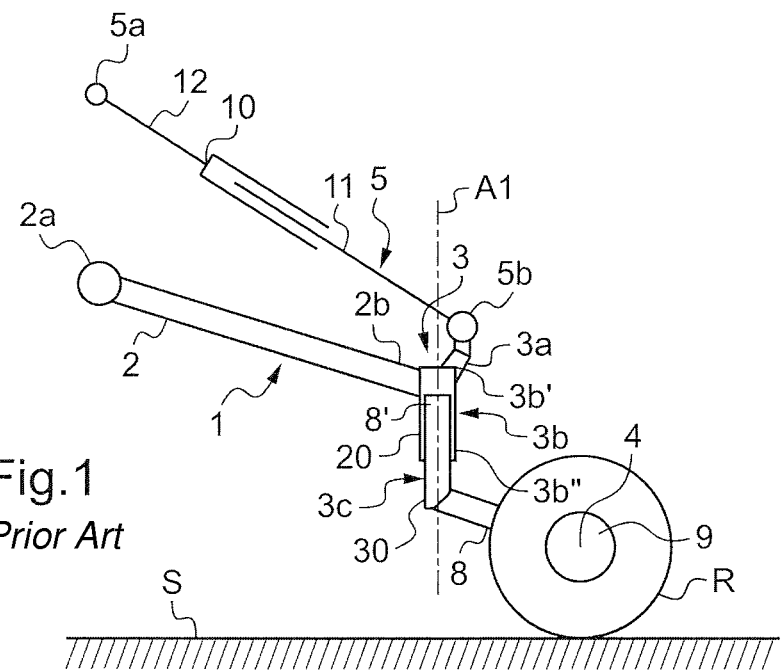
Fig.1 *Prior Art*
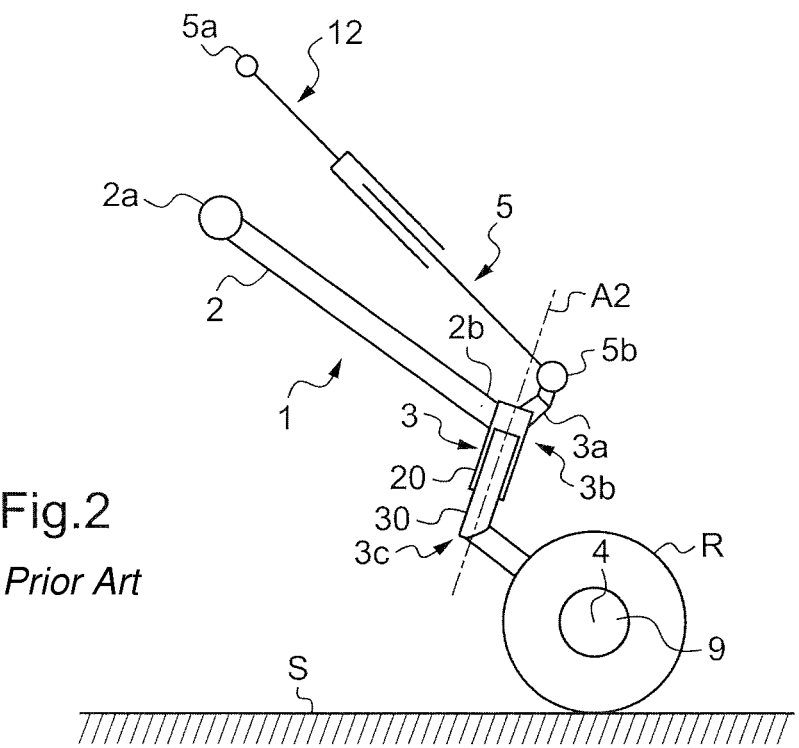
Fig.2 *Prior Art*

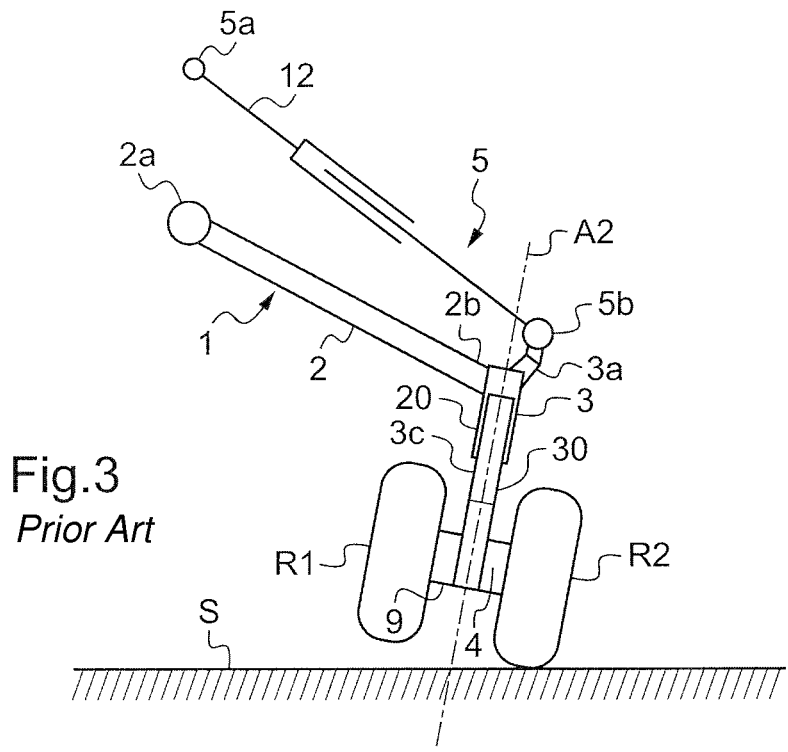
Fig.3 *Prior Art*
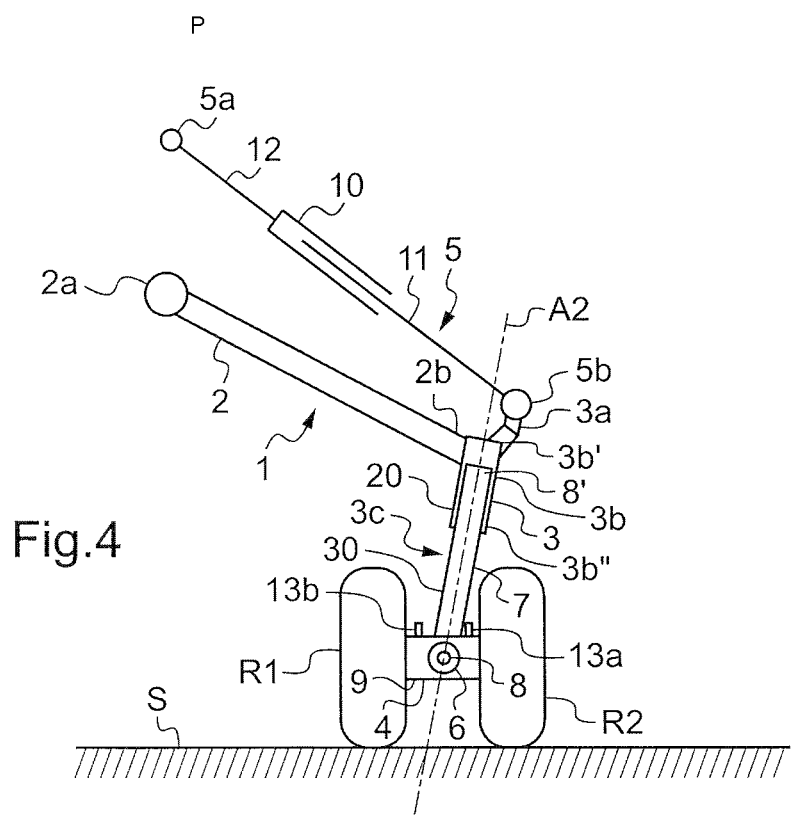

AIRCRAFT UNDERCARRIAGE HAVING A ROCKER LEVER WITH A SWIVEL AND HINGED TWIN WHEELS

CROSS REFERENCE TO RELATED APPLICATIONS

This application claims the benefit of FR 09 05985 filed on Dec. 11, 2009. The disclosure of which is incorporated in its entirety by reference herein.

FIELD OF THE INVENTION

The present invention relates to an aircraft undercarriage having a rocker lever provided with a swivel and hinged landing (twin) wheels.

Such an undercarriage has a rocker lever connected at its bottom end via a swivel to a set of two wheels connected together by a wheel axle, such wheels also being known as a twin "wheels" on a "wheel set" or "diabolo" in French language.

BACKGROUND OF THE INVENTION

An undercarriage may comprise firstly a main undercarriage close to the center of gravity in order to support a major fraction of the weight of the aircraft, and secondly an auxiliary undercarriage arranged at the front or the rear of the aircraft to contribute to steering the aircraft when taxiing on the ground. In this context, an undercarriage arranged at the front of the aircraft is referred to as a "nose" undercarriage and an undercarriage arranged at the rear of the aircraft is referred to as a "tail" undercarriage.

An auxiliary undercarriage is thus steerable, unlike a main undercarriage.

In addition, when landing gear is configured in the so-called "tricycle" configuration, it has two main undercarriages and one auxiliary undercarriage.

Under such circumstances, the undercarriage with a rocker lever may be used as an auxiliary undercarriage for an aircraft, in particular for a helicopter.

When used as an auxiliary undercarriage, it is necessary to mount the twin wheels on a swivel so as to make steering on the ground possible.

FIG. 1 is a diagrammatic view of a rocker lever undercarriage, the undercarriage 1 having a rocker lever 2, a swivel 3, and a twin wheels 4 shown in an ideal static position on the ground. The twin wheels 4 comprise an assembly of two wheels (only one wheel R is visible in FIG. 1) that are connected together by a shaft referred to herein as a "wheel axle". The wheels of the twin wheels are placed on either side of the midplane of the swivel 3 and of the rocker lever 2.

The swivel 3 then presents a first portion 3b that is fastened to the rocker lever 2 and a second portion 3c that extends along a swivel axis A1 extending along the middle of the swivel 3, the second portion 3c being fastened to the twin wheels 4. Under such circumstances, the second portion 3c is free to swivel about said swivel axis A1 relative to the first portion 3b.

In this position, the swivel axis A1 of the swivel 3 is substantially perpendicular to the ground S. The wheels R of the twin wheels 4 bear against the ground S in symmetrical manner.

However, since an aircraft fitted with such a rocker lever undercarriage presents weights in use that vary approximately over a range of one to two between a minimum weight and a maximum utilization weight, the rocker lever undercarriage is subjected to different forces in use. Thus, in use, it can happen that the static deflection of the undercarriage varies and that the swivel axis A1 of the swivel is no longer perpendicular to the ground.

FIG. 2 shows an example of a position for the rocker lever undercarriage in which the swivel axis is no longer perpendicular to the ground, with this occurring for example when the aircraft is light in weight or else when it has its center of gravity offset longitudinally a long way towards the tail.

The elements 2, 3, and 4 of the rocker lever undercarriage 1 remain unchanged compared with FIG. 1. However, the swivel axis A2 of the swivel 3, in this example position, is no longer perpendicular to the ground S.

To a certain extent, such an inclination for the swivel 3 is not a particular impediment, providing the twin wheels 4 can perform their function. However, in the event of turning or towing with a lateral component, the effect of the swivel 3 being inclined means that the twin wheels R of the twin wheels 4 are no longer symmetrical and it can happen that one of the wheels is lifted off the ground.

FIG. 3 shows an example of one of the wheels of a rocker lever undercarriage being lifted off the ground. Because of the inclination of the swivel axis A2 of the swivel 3 relative to the vertical, the first wheel R1 of the twin wheels 4 is no longer in contact with the ground S, so the twin wheels 4 rests on the ground S solely via its second wheel R2.

This phenomenon presents five negative effects:

increasing the load on the wheel that remains on the ground, thereby reducing its lifetime or indeed requiring it to be reinforced, thus requiring additional material for constructing it, thereby increasing its size and its weight and simultaneously increasing its manufacturing cost;

generating an additional twisting moment in the elements of the undercarriage because of the asymmetry of the reaction at the two wheels of the twin wheels;

generating a return movement about a vertical axis that gives the aircraft a small amount of under-steer for small angles and a small amount of over-steer for large angles;

when turning, since the wheel carrying the load is the inner wheel, this reduces the size of the stability triangle of the aircraft when turning; and the visual appearance is unsightly and mechanically unsound.

To mitigate those drawbacks, proposals have been made in a first solution to use a single wheel, since the phenomenon only occurs when using a twin wheels. That solution is sometimes also used for a tail undercarriage.

The use of a single wheel serves to solve only three of the above-mentioned drawbacks, i.e. load distribution, twisting moment, and reduced stability in turning. There nevertheless remain the above-mentioned drawback concerning return moments, even if it is slightly reduced, and also the drawback relating to appearance. Although those two remaining drawbacks may be acceptable for a tail undercarriage, e.g. a tail wheel, this is not true of a nose undercarriage.

Furthermore, the use of a single wheel requires a wheel to be provided that is of a size larger than the size of the two wheels of a twin wheels. Using such a wheel in an undercarriage that is retractable thus presents the drawback of requiring a larger wheel bay.

A second solution that has been proposed is to use an active mechanical element enabling the two wheels of the twin wheels to remain in contact with the ground.

In a similar context, document CA-A-523 199 describes an undercarriage enabling an aircraft to be controlled on the ground by steering the twin wheels about a vertical axis.

That document proposes compensating either the angle of inclination of the wheel axle of the twin wheels or incorporating a mechanical system for generating different speeds of rotation for the two wheels of the twin wheels.

That therefore requires the addition of a complicated active compensation system, thereby increasing the cost of such an undercarriage as well as its size and its weight.

Furthermore, that document does not deal with the problem caused by the swivel of the undercarriage being inclined relative to the vertical.

SUMMARY OF THE INVENTION

The problem addressed by the present invention is to be able to correct asymmetry in the bearing on the ground of the wheels of two or more, e.g., twin wheels of a rocker lever undercarriage when the swivel of said undercarriage is in an inclined position relative to the vertical, while said undercarriage is in use, and to do so with a correction element that is simple and effective.

To this end, the invention provides an aircraft undercarriage. The undercarriage has a rocker lever with a first end zone for fastening to at least one point of the structure of the aircraft and a second end zone connected via a swivel to two or more wheels. A wheel axle connects together two of the wheels. The swivel has a first portion that is fastened to said second end zone of the rocker lever and a second portion presenting freedom to swivel relative to the first portion about a swivel axis of said swivel. The second portion is connected to said wheel axle of the twin wheels. The connection between the second portion of said swivel and said wheel axle presents a hinge.

Advantageously, the hinge is located in the middle of said wheel axle and presents a pivot axis perpendicular to said wheel axle and to said swivel axis of the swivel.

Advantageously, the pivoting movement of the hinge is limited by at least one stop. Said at least one stop may then be arranged inside or outside said hinge, e.g. on the wheel axle.

Preferably, said hinge presents smooth bearings, such smooth bearings being known to the person skilled in the art.

Alternatively, said hinge presents elastomer bearings, e.g. bearings of the type that may be used on the hinges of the elastomer bottom suspension arms of automobile front axles.

These bearings are generally constituted by two concentric tubes connected together by a vulcanized elastomer material. Assembly by clamping or by any other means provides a degree of vibration isolation, and imparts to the hinge an amount of return torque that depends on the dimensioning of the elastomer.

As a variant, the bearings could equally well be made by using ball joints or rolling bearings.

Advantageously, the undercarriage includes a damper and energy absorber system comprising a cylinder and a rod slidable in the cylinder, said cylinder having an extension provided with first fastener means for fastening to a structure of an aircraft, said rod having second fastener means fastened to the first portion of said swivel.

Advantageously, said first portion of the swivel comprises a tubular socket, said second portion comprising a connection member mounted to swivel freely about said swivel axis of the swivel, said connection member having a first end portion penetrating in part into said tubular socket and a second end portion connected to the wheel axle by means of said hinge.

Advantageously, the second end portion presents an angle relative to the first end portion, said second end portion providing the connection with said wheel axle of the twin wheels. The first end portion and the second end portion are then not in alignment.

The invention also provides an aircraft including at least one such undercarriage.

The undercarriage is preferably an auxiliary undercarriage.

The technical effect of such a hinge placed between the bottom end of the swivel and at the center of the twin wheels is to restore operating symmetry to the twin wheels, thereby serving in particular to enable both of its wheels to remain equally in contact with the ground even when the swivel axis of the undercarriage is not in a position that is perpendicular to the ground.

BRIEF DESCRIPTION OF THE DRAWINGS

The invention is described below in greater detail in non-limiting manner with reference to the accompanying figures, in which:

FIG. 1 is a diagrammatic profile view of a rocker lever undercarriage, of the prior art, in a static position on the ground with the swivel axis perpendicular to the ground;

FIG. 2 is a diagrammatic profile view of a rocker lever undercarriage of the prior art in a static position on the ground with the swivel axis inclined relative to the vertical;

FIG. 3 is a diagrammatic profile view of a rocker lever undercarriage of the prior art in a static position on the ground with the swivel axis inclined relative to the vertical, the twin wheels being swiveled through 90 degrees about the swivel axis relative to FIG. 2, one of the wheels of the twin wheels then being lifted off the ground; and FIG. 4 is a diagrammatic profile view of a rocker lever undercarriage in a static position on the ground with the swivel axis inclined relative to the vertical, this undercarriage being provided with a hinge between the swivel and the wheel axle of the twin wheels, in accordance with the present invention.

DETAILED DESCRIPTION OF THE PREFERRED EMBODIMENT

FIGS. 1 to 3 are described above in the introduction of the description of the present application and they show an undercarriage of the prior art.

The undercarriage comprises a rocker lever 2 that extends from a first end zone 2a towards a second end zone 2b. Under such circumstances, the first end zone 2a represents the top portion of the rocker lever 2 and is hinged at at least one point to a structure carried by the aircraft, such as a bottom portion P of the fuselage of the aircraft, shown in FIG. 4. It can be understood that this structure is advantageously a bottom portion P of the fuselage of the aircraft, or an element that depends from said bottom portion, the structure being sufficiently strong to accommodate the loads that come from the undercarriage.

In addition, the undercarriage is provided with a swivel 3 that may comprise a first portion 3b in the form of a tubular socket 20 open at one end to receive a second portion 3c of the swivel 3. More precisely, the second portion 3c comprises a link member 30 extending from a first end portion 8' towards a second end portion 8. The first end portion 8' penetrates in part into the tubular socket 20 and co-operates with the tubular socket 20. Conversely, the second end portion 8 is connected to a twin wheels 4.

In this context, it should be observed that the two wheels R1 and R2 of the twin wheels 4 are independent, i.e. although they are both on the same wheel axle 9 there is no mechanical rotary connection between them. Thus, the two wheels rotate at different speeds while the aircraft is turning on the ground.

The first end 3b' of the tubular socket 20, remote from its open second end 3b" for receiving the first end portion 8' of the connection member 30 is fastened to the second end zone 2b of the rocker lever 2.

In addition, it should be observed that the connection member 30 is free to swivel about the swivel axis 3, this swivel axis being referenced A1 in FIG. 1 and A2 in FIGS. 2 to 4.

The connection member 30 is thus merely contained in part inside the tubular socket 20 and thus presents a portion that projects outside said tubular socket 20. This projecting portion is terminated by a second end portion 8 optionally extending at an angle relative to the remainder of the connection member 30, and in particular relative to the first end portion 8'. This second end portion 8 of said swivel 3 is connected to the wheel axle 9 of the twin wheels 4.

Thus, the connection member 30 comprises in succession a first end portion 8' extended by the second end portion 8, the first end portion 8' penetrating in part into the tubular socket 20 while the second end portion 8 situated outside the tubular socket 20 is connected to the wheel axle 9.

Advantageously, a damper 5 may be disposed between a point of the structure of the aircraft and the swivel 3. Conventionally, the damper 5 comprises a cylinder 10 and a rod 11 slidable in the cylinder 10.

The cylinder 10 of the damper 5 is then connected to said point of the structure of the aircraft via first fastener means 5a of an extension 12. Conversely, a second fastener means 5b fastens the rod 11 of the damper 5 to the swivel 3 via an appendix 3a, this appendix 3a being located in the top portion of said swivel 3.

With reference to FIG. 4, the invention includes a hinge 6 arranged between the bottom portion of the swivel 3, i.e. the second end portion 8 of its swiveling second portion 3c, and the wheel axle 9 of the twin wheels 4 presenting the two wheels R1 and R2 of the rocker lever undercarriage.

Apart from this hinge 6, the other elements of the rocker lever undercarriage 1 remain unchanged in comparison with FIGS. 1 to 3.

With reference to FIG. 4, in accordance with the present invention, the undercarriage 1 for an aircraft comprises a rocker lever 2, the lever 2 having a first end zone 2a for fastening to at least one point of the structure of the aircraft, and a second end zone 2b. This second end zone 2b is connected via a swivel 3 to a twin wheels 4 comprising a wheel axle 9 connecting together two landing wheels R1 and R2, the swivel 3 presenting a first portion 3b fastened to said second end zone 2b of the rocker lever 2 and a second portion 3c presenting freedom to swivel relative to the first portion 3b about the swivel axis A2 extending along the middle of said swivel 3, said second portion 3c being connected to said wheel axle 9 of the twin wheels 4.

The undercarriage 1 is characterized in that the connection between the second portion 3c of said swivel 3 and said wheel axle 9 of the twin wheels 4 presents a hinge 6.

The hinge 6 of the undercarriage 1 of the present invention may be said to be "passive" since properly speaking it does not initiate any correction on the twin wheels 4 as might be done by an actuator or any other means for actively correcting the position of the twin wheels 4. On the contrary, its action takes place when there is nothing to prevent the twin wheels 4 pivoting relative to the swivel 3.

Without adding any complicated and bulky mechanical correction means, this characteristic makes it possible for a wheel axle 9 of the twin wheels 4, connecting together the two wheels R1 and R2, to conserve a parallel relationship with the ground, regardless of the angle of inclination of the swivel axis of the swivel 3.

The wheel axle 9 of the twin wheels 4 thus remains substantially parallel to the ground S and both wheels R1 and R2 of the twin wheels 4 rest symmetrically on the ground S, it being understood that said wheel axle 9 may perform pivoting movement relative to the swivel 3, with this being made possible by the hinge 6.

This pivoting movement of the wheel axle 9 of the twin wheels 4 relative to the second portion 3c of the swivel 3 via the hinge 6 is advantageously limited by a stop 13a or 13b so as to avoid there being interference between a portion 7 of the second portion 3c of the swivel 3 that faces a wheel and the top end of said wheel, e.g. a portion 7 and the wheel R2 as shown in FIG. 4.

In addition, in FIG. 4, it can be seen that a stop 13a or 13b is shown as being present on either side of the swivel 3 facing towards a wheel R1 or R2. These stops are located outside the hinge 6 and they are in the form of respective studs 13a or 13b. It should be kept in mind that a stop 13a or 13b of the present invention could nevertheless present some other shape or be located elsewhere.

In a first preferred embodiment of the hinge 6 of the present invention, the hinge 6 advantageously presents smooth bearings.

Such smooth bearings serve to provide guidance by sliding when the wheel axle of the twin wheels 4 pivots relative to the swivel 3. They are thus advantageously lacking in elements interposed between the wheel axle 9 and the second end portion 8 of the second portion 3c of the swivel 3, representing the bottom end of the swivel 3, unlike ball bearings where guidance is provided by one or more rolling bearings. The sliding of the wheel axle 9 of the twin wheels 4 relative to the swivel 3 takes place with a minimum of wear and friction.

The sliding movement occurs directly between the sliding coating of the bearing body and the part that is to be supported, i.e. the wheel axle 9 of the twin wheels 4. Lubrication may be provided by means of lubricants incorporated in the sliding layer or by a solid layer applied to the bearing body.

In a second embodiment of the hinge 6 of the present invention, said hinge 6 may present elastomer bearings.

Such bearings also present the possibility of exerting a light return force urging the twin wheels 4 to the flat position.

Alternatively, it is possible to use rolling bearings, e.g. ball bearings, roller bearings, or needle bearings.

The advantages of the present invention are numerous. Mention may be made amongst others of:

the equal distribution of load between the two wheels of the twin wheels;

the eliminating of any twisting moment generated by a difference in loading between the two wheels of the twin wheels;

a small reduction in the return moment about the vertical axis; and an increase of stability when turning.

The invention is not limited in any way to the embodiment described and shown which is given purely by way of example.

What is claimed is:
1. An auxiliary undercarriage, associated with an aircraft for landing on the ground, the aircraft having a bottom portion to which is hinged the undercarriage, the auxiliary undercarriage comprising:
a wheel axle;

two wheels connected laterally by the wheel axle to form a twin wheel assembly and each of the two wheels being independent in rotation;

a rocker lever having: a first end zone at a top portion of the auxiliary undercarriage, the auxiliary undercarriage being hinged by the first end zone to the bottom portion for fastening to the auxiliary undercarriage to the aircraft and a second end zone; the second end zone of the rocker lever extending along with a swivel axis, wherein the swivel axis is configured to be inclined at a longitudinal angle offset from a vertical direction;

a steerable swivel steerable about the swivel axis and connecting the rocker lever to the subassembly together with the twin wheels, the steerable swivel including a first portion fastened to the second end zone of the rocker lever and a second portion to be swiveled relative to the first portion about the swivel axis, the second portion being connected to the wheel axle of the twin wheel subassembly;

a damper disposed between a point of the bottom portion of the aircraft and the steerable swivel; and a hinge disposed along the wheel axle, wherein the second portion of the steerable swivel is pivotally connected to the hinge to pivot in a lateral direction, the hinge being located laterally in the middle of the wheel axle and has a pivot axis perpendicular to the wheel axle and to the swivel axis;

wherein the swivel pivots in the lateral direction with respect to the wheel axle to allow the swivel axis to be positioned at the longitudinal angle offset from the vertical direction while maintaining the wheel axle in a generally horizontal position.

2. The auxiliary undercarriage according to claim 1, further comprising at least one stop wherein the lateral pivoting movement of the hinge is limited by the at least one stop.

3. The auxiliary undercarriage according to claim 1, wherein the hinge includes smooth bearings.

4. The auxiliary undercarriage according to claim 1, wherein the hinge includes elastomer bearings.

5. The auxiliary undercarriage according to claim 1, further comprising an energy absorber system including a cylinder and a rod slidable in the cylinder, the cylinder having an extension fastened to the bottom portion of the aircraft, and the rod being fastened to the first portion of the steerable swivel.

6. The auxiliary undercarriage according to claim 1, wherein the first portion of the steerable swivel includes a tubular socket, the second portion includes a connection member mounted to swivel about the swivel axis of the steerable swivel, the connection member having a first end portion penetrating in part into the tubular socket and a second end portion connected to the wheel axle by the hinge.

7. The auxiliary undercarriage according to claim 6, wherein the second end portion extends at an angle relative to the first end portion, the second end portion providing the connection with the wheel axle.

8. The auxiliary undercarriage according to claim 1, further comprising an energy absorber system including a cylinder and a rod slidable in the cylinder, the cylinder being fastened to a the bottom portion of the aircraft and the rod being fastened to a stationary portion of the steerable swivel.

9. The auxiliary undercarriage according to claim 8, wherein the stationary portion of the steerable swivel includes a tubular socket, the swivel portion being disposed rotatably within the socket to swivel about the swivel axis, swivel portion extending from the socket and connected to the wheel axle at the hinge.

10. The auxiliary undercarriage according to claim 9, wherein the second end portion presents an angle relative to the first end portion, said second end portion providing the connection with said wheel axle of the twin wheels.

11. An aircraft comprising:
a main undercarriage positioned to support a fuselage of the aircraft;
an auxiliary undercarriage arranged to steer the aircraft and positioned longitudinally at a distance from the fuselage center-of-gravity being further than a distance of the main undercarriage from the fuselage center-of-gravity, the auxiliary undercarriage including:
a rocker lever pivotally fastened to the aircraft at a first end;
a swivel assembly including a stationary portion fastened to a second end of the rocker lever and a swivel portion rotatably connected to the stationary portion and being able to rotate about a swivel axis of the swivel assembly, wherein the swivel axis is configured to be inclined longitudinally at an angle offset from a vertical direction;
a wheel subassembly connected to the swivel assembly along a wheel axle connecting a pair of wheels laterally; and
a hinge disposed along the wheel axle, wherein a distal end of the swivel portion is pivotally connected to the hinge to pivot in a lateral direction;
wherein the swivel assembly pivots in the lateral direction with respect to the wheel axle to allow the swivel axis to be positioned at the longitudinal angle offset from a vertical direction while maintaining the wheel axle in a generally horizontal position.

12. The aircraft according to claim 11 wherein the hinge is located in the middle of the wheel axle and has a pivot axis perpendicular to the wheel axle and to the swivel axis.

13. The aircraft according to claim 11 wherein the wheel axle is positioned forward of the swivel assembly longitudinally relative to the fuselage.

14. An undercarriage of an aircraft comprising:
a main undercarriage positioned to support a fuselage of the aircraft;
an auxiliary undercarriage arranged to steer the aircraft and positioned at a distance from the fuselage center-of-gravity being further than a distance of the main undercarriage from the fuselage center-of-gravity, the auxiliary undercarriage including:
a rocker lever pivotally fastened to the fuselage at a first end;
a swivel assembly including a stationary portion fastened to a second end of the rocker lever and a swivel portion rotatably connected to the stationary portion and being able to rotate about a swivel axis of the swivel assembly, wherein the swivel axis is configured to be inclined longitudinally at an angle offset from a vertical direction;
a wheel subassembly connected to the swivel assembly along a wheel axle connecting a pair of wheels laterally;
a hinge disposed along the wheel axle, wherein a distal end of the swivel portion is pivotally connected to the hinge to pivot in a lateral direction,
wherein the swivel assembly pivots in the lateral direction with respect to the wheel axle to allow the swivel axis to be positioned at the longitudinal angle offset from the vertical direction while maintaining the wheel axle in a generally horizontal position and steering the wheel assembly based on rotation of swivel portion about the swivel axis.

15. The undercarriage according to claim 14 wherein the hinge is located in the middle of the wheel axle and has a pivot axis perpendicular to the wheel axle and to the swivel axis.

16. The undercarriage according to claim 14 wherein the wheel axle is positioned forward longitudinally of the swivel assembly relative to the fuselage.

* * * * *